Patented Oct. 28, 1952

2,615,818

UNITED STATES PATENT OFFICE 2,615,818

BITUMINOUS EMULSION

Paul E. McCoy, San Francisco, Calif., assignor, by mesne assignments, to American Bitumuls & Asphalt Company, San Francisco, Calif., a corporation of Delaware No Drawing. Application March 21, 1950, Serial No. 151,055

7 Claims. (Cl. 106—277)

The present invention relates to an improved bituminous coating composition, to a process of making the same and to a composition comprising an object coated with or by means of such bituminous coating composition.

In the coating or covering of various objects with a bituminous material or bituminous composition, such as an asphaltic emulsion, the bituminous material does not readily coat many substances, or, if it does coat them, the bond or adhesion between the bituminous material and the substance to be coated is too insecure to endure under conditions of use, especially in the presence of water and of water vapor, for a satisfactory period of time. This difficulty with respect to the bonding or adhesion between the bituminous material and the substance coated therewith has been found to be especially troublesome when the substance to be coated is hydrophilic in character, that is, preferentially wetted by water. In the making of asphaltic compositions by coating a mineral aggregate with an asphalt for the surfacing of a highway or construction of roads, many aggregates are found to have a greater affinity for water than for asphalt, that is, such aggregates are relatively hydrophilic. Hence, even when such aggregate is coated with asphalt, water in vapor form has a tendency to permeate the asphalt to the surface of the aggregate and, since the aggregate is hydrophilic, a water film intervenes between the asphalt and the aggregate, and in this manner tends to loosen and strip the asphaltic coating from aggregates of this character.

An object of the invention is to prepare a bituminous composition, such as asphalt, having a strengthened bond or adhesiveness between an object coated therewith and the bituminous material.

Another object of this invention is to prepare a bituminous composition, such as aggregate coated with asphalt, in which the bituminous material coated on the aggregate resists the stripping action of water, even when the aggregate is hydrophilic in character.

Other objects of the invention will become apparent from the description which follows and from the appended claims.

I have found that by incorporating an alkali metal persulfate, including ammonium and lithium persulfate, into a bituminous composition the adhesion of the bituminous material in the emulsion for various objects, especially hydrophilic aggregate, is substantially and markedly increased. This highly desirable result is accomplished without rendering the bituminous material corrosive to metals with which it may come into contact and without any adverse effect upon the bituminous material. When the bituminous material is in the form of an emulsion these persulfates may be incorporated into the emulsion without causing a breakdown of the emulsion. Though the persulfates are effective to lower the pH, the lowering is not usually sufficiently severe to prevent emulsification or to cause breakdown of the emulsion. Furthermore, when the persulfates are incorporated in a bituminous emulsion, in addition to such outstanding results with respect to increased adhesiveness between the bituminous material and hydrophilic aggregate, this new process, as well as the resulting product, has associated therewith the highly desirable results of increased drying rate and improved mixing ability characterizing the emulsion.

The term "alkali metal persulfate" as used herein and in the claims is intended to include ammonium persulfate, and mixtures of alkali metal persulfates with themselves, as well as mixtures of persulfates including ammonium persulfate.

Although the process of this invention is useful for, and is directed to, the treatment of those bituminous emulsions which are deficient in their ability to remain coated or bonded to an object, especially a hydrophilic object, and particularly so deficient when subjected to the deteriorating action of water and which have poor drying rates and mediocre mixing ability, it has been found especially useful and effective in such emulsions in which the emulsifying agent is an alkali metal salt of an organic acid and particularly of a high molecular weight organic substance or compound, such as the alkali metal salt resulting from the reaction of caustic alkali with certain acids, preferably of molecular weight above about 300, in the asphalt itself, as in the case of the well-known Montgomerie or Braun emulsions, described in U. S. Patents 1,643,675 and 1,737,491, respectively.

In some bituminous emulsions it may be desirable to use a stabilizing agent along with the persulfate material, and this is usually found to be the case with those emulsions with which a stabilizing agent is ordinarily used, as known in the art, such as with the emulsions made by the well-known Montgomerie or Braun processes in which the asphalt is emulsified by means of a caustic solution. Any of the stabilizers suitable for ordinary purposes may be used, but those found best suited for the purpose of this invention are those prepared from the wood of southern long-leaf pine. This stabilizer is a hard, high-melting, dark-colored resinous material, and is incorporated in the emulsion either as a slurry in water or in the form of a soap made by the saponification of the resin with sodium hydroxide. Emulsions so stabilized are described in U. S. Patent No. 2,256,886 to Buckley. Other examples of stabilizing agents are such materials as blood, shown, for example, in the Claude L. McKesson Patent No. 2,074,731 and in the Walter D. Buckley et al. Patent No. 2,372,658; glycinin-containing material, as shown in Patent No. 2,336,468 to Walter C. Cole et al.; the lignin material disclosed in Patent No. 2,483,806 to Walter D. Buckley et al.

In the case of primary emulsions not containing stabilizing agents such as the quick-setting emulsions of the Montgomerie or Braun kind, that is, those in which the emulsifying agent is formed by the reaction of a caustic alkali with certain organic acids in the asphalt itself, it is preferred to add the persulfate during the process of emulsification. When adding the persulfates to these bituminous-aqueous emulsions which are sensitive to the addition of acidic materials, I have found it desirable to add to the aqueous salt solutions of the persulfate an amount of volatile nitrogen base material, such as ammonia, prior to incorporating the persulfate in the emulsion. In carrying out this embodiment of the invention sufficient nitrogen base is added to a solution of the persulfate, preferably a 10% solution, to increase the pH of the solution to as high as 10, preferably to about 8. The resulting persulfate solution is then added to the emulsion. If desired, it may be added to the alkaline water used for emulsification and this water, together with asphalt or other material to be dispersed, is introduced into suitable emulsifying apparatus to produce the emulsion.

In another embodiment of the invention, a solution of the persulfate is incorporated into fluid bituminous substance, rendered fluid by heating or fluxing with light fractions, then mixing the persulfate solution thereinto with preferably a high degree of agitation. In this instance a bituminous-aqueous emulsion of the water-in-oil type is obtained after which, if desired, the water may be wholly or in part removed by careful heating. Although more or less concentrated persulfate solutions can be employed, say, ranging from about 5 to 15% concentration, a 10% solution will usually be found satisfactory and is preferred.

The proportion of the persulfate incorporated in the bituminous material for the purposes of my invention may vary from about 0.05% to about 2% by weight of the emulsion, but the preferred working range is from about 0.1% to about 1% and the optimum proportion for best results with regard to increased adhesiveness is about 0.5%. As hereinabove indicated it is usually preferred to make the addition of persulfate to bituminous-aqueous emulsion in solution form (preferably 5-10% solution).

In accordance with the preferred embodiment of this invention, the persulfate is incorporated into a relatively stable oil-in-water type medium-setting or slow-setting emulsion, and it may be incorporated in the bituminous-aqueous emulsion after the emulsion has been formed or at any convenient stage during its formation. However, though it is preferred to incorporate the persulfate in a stable bituminous-aqueous emulsion, the persulfate may be incorporated into primary emulsions or quick-setting emulsions or in bituminous-aqueous emulsions of the water-in-oil type, as hereinabove described. Also, the persulfate may be incorporated directly into the bituminous material or, if desired, the material to which the bituminous coating is to be applied may be first coated with an aqueous solution of the persulfate.

Though all of the alkali metal persulfates are operative to an extent, I have found ammonium persulfate to be the most effective; it is therefore the preferred persulfate. The results obtained from the use of ammonium persulfate are far superior to those flowing from the use of the other persulfates, and, indeed, in cases where the stringent requirements are specified, ammonium persulfate will be found to be the only effective persulfate. For this reason the other persulfate materials are not regarded as the functional equivalents of ammonium persulfate, but since all the alkali metal persulfates do effect an improvement of the emulsions, they are included within the broad aspects of the invention.

In order to determine the characteristics of adhesiveness, drying rate and mixing ability of the coating compositions prepared in accordance with my invention, the following tests were used:

ADHESION TEST

A 50 g. sample of a mixture consisting of 93% of one-quarter-inch to ten-inch mesh stone or gravel is stirred with the bituminous material until the stone is thoroughly coated. The coated stone is then cured at 200° F. until substantially at constant weight (approximately 24 hours). It is then placed in a 600 ml. Pyrex beaker containing 400 cc. of boiling distilled water, and the whole is boiled for three minutes, during continuous stirring with a ⅜-inch diameter glass rod, moved in a circular motion at a rate of 60 times per minute. The beaker and its contents are then removed from the flame and allowed to stand until evolution has ceased. The water is then poured off and the aggregate dumped out of the beaker onto a piece of absorbent paper. When dry, the mixture is visually examined for loss of coating, and the percentage of the aggregate remaining coated is determined by visual inspection by an experienced operator. This test is a severe test for adhesiveness and is in fact far more severe than conditions usually encountered in practice, and provides a means of quantitatively measuring adhesiveness.

DRYING RATE

Some emulsions although possessing certain desired properties are unsatisfactory for certain uses because of objectionable drying rates. Such emulsions are characterized by a very slow dehydration rate, and when applied as a coating, or the like, form a film or skin on the surface in a manner such that proper drying of the underlying emulsion is inhibited or prevented. Although emulsions having this inferior drying property are useful for certain purposes, it is highly advantageous, and in some instances essential, that a bituminous emulsion be characterized by the ability to give off a major portion of its contained water in a reasonably short time. A convenient dehydration test, and the one utilized for obtaining the data given in the present specification on drying rates is as follows:

100 g. of the emulsified bitumen to be tested is placed in a tarred Pyrex dish, 77 mm. in inside diameter by 40 mm. in height, having a flat bottom and straight sides. The dish is placed in the center of a shallow pan about 5 inches in diameter, and 50 g. of granular anhydrous calcium chloride is spread in the pan so that it surrounds the dish containing the emulsion. The entire unit is then placed in a constant temperature oven set at 100° F. At the end of exactly 96 hours, during which time the sample is not disturbed by stirring or excessive movement, the loss of weight of the emulsion is determined. The dehydration loss is expressed as the ratio of loss in this test in 96 hours to the test for "residue at 163° C." which is a percentage of residue as determined by ASTM Standard Specification D6–39T, except that the determination of residue is the average of three 50 g. samples heated for 3 hours in a dish or beaker of not less than 3 inches in diameter and of sufficient depth to prevent overflow.

MIXING ABILITY 50 g. of high early strength Portland cement, conforming with "fineness" requirements of ASTM Standard Specifications C150–46, are sifted through a No. 80 sieve and are placed in a tin having a capacity of approximately 500 cc. The emulsion to be tested is diluted with distilled water to a residue of 55% as determined in the test for "residue at 163° C." previously described. 100 cc. of the emulsion thus diluted are poured on the cement and stirred with a ½-inch steel rod 60 times during one minute. 150 cc. of distilled water is then added and stirring continued for 3 minutes. The mixture is poured through a tarred 14-mesh iron wire sieve, rinsing until wash water is clear. The sieve is then placed in a tarred shallow pan, heated until dry, and weighed. The quantity of the material retained on the screen and in the pan is the part broken and is a measure of the mixing ability and is rated by an experienced operator in such terms as "poor," "fair," "good," "excellent," etc.

To illustrate the practice of the invention, the following examples are given. It is not intended, however, to limit the invention to the examples, since many variations of the preparation and nature of the composition falling within the scope of the invention will readily occur to those skilled in the art.

EXAMPLE 1

A slow-setting emulsion meeting ASTM Specifications SS–1 for slow-setting emulsions, was prepared with a California asphalt of penetration 150–200 at 77° F., employing a pinewood resin stabilizing agent material in accordance with Buckley Patent No. 2,256,886, the amount of stabilizing agent being 2% of the finished emulsion. Batches of the finished emulsion were subsequently treated with varying amounts by weight of ammonium persulfate and potassium persulfate in solution form as indicated in the table below. The resulting emulsions were tested for drying rate, mixing ability, and for adhesiveness, employing Massachusetts rhyolite known to be highly hydrophilic aggregate, in accordance with the tests hereinabove described.

Table

|  | 1 | 2 | 3 | 4 | 5 | 6 | 7 |
|---|---|---|---|---|---|---|---|
| Emulsion | 95.9 | 95.6 | 95.3 | 95.0 | 95.6 | 95.3 | 95.0 |
| $K_2S_2O_8$ | 0.0 | 0.1 | 0.3 | 0.5 | | | |
| $(NH_4)_2S_2O_8$ | 0.0 | | | | 0.1 | 0.3 | 0.5 |
| Water | 4.1 | 4.3 | 4.4 | 4.5 | 4.3 | 4.4 | 4.5 |
| Mixing Ability | Poor | (¹) | Fair | Fairly good | Fair | Good | Excellent |
| Drying rate | 0.244 | 0.280 | 0.546 | 0.720 | 0.295 | 0.566 | 0.775 |
| Adhesion | 10 | 15 | 60 | 70 | 30 | 75 | 100 |

¹ Slightly better than 1.

From the foregoing table it will be seen that the optimum concentration for best results is 0.5% for both potassium and ammonium persulfate, although substantial improvement in adhesion, drying rate and mixing ability is obtained with lower salt concentrations. It is also apparent from the table that ammonium persulfate is considerably more effective than potassium persulfate, for, as can be seen from the table, a salt concentration of 0.5% gave an adhesion of 70% in the case of potassium persulfate as compared with 100% in the case of ammonium persulfate.

EXAMPLE 2

A quick-breaking emulsion was prepared according to the process of Montgomerie U. S. Patent 1,643,675, by emulsifying about 57 parts by weight of hot molten California asphalt having a penetration at 77° F. of about 250 in 43 parts by weight of about 0.3% aqueous caustic solution. A 10% solution of ammonium persulfate was prepared, and there was added thereto sufficient ammonia to raise the pH of the persulfate solution to a pH of about 9. The so-treated persulfate solution was then added slowly to a portion of the emulsion, until about 0.5 of the persulfate salt, based on $(NH_x)_2S_2O_8$, had been added. The resulting emulsion was then tested for adhesion in accordance with the adhesion test hereinabove described. The adhesion value of the treated portion of the emulsion was 90% as compared with 10% for the untreated portion of the emulsion.

EXAMPLE 3

To 95 parts by weight of MC–2 cutback, warmed to about 130° F., there was added from a pipette with vigorous and constant stirring 5 parts by weight of a 10% solution of ammonium persulfate, whereby a water-in-oil bituminous aqueous emulsion was obtained. The emulsion was then subjected to the adhesion test hereinabove described. The cutback treated in accordance with the invention showed a substantial improvement in adhesion over untreated cutback.

The bituminous-aqueous emulsions contemplated by the present invention are emulsions that can be prepared from water-insoluble, water-dispersible, organic thermoplastic bituminous substances normally solid, semi-solid or viscous liquids at ordinary atmospheric temperatures. These materials are bitumens, such as petroleum and native asphalts, native mineral waxes, asphaltites; pyrobitumens, such as asphaltic pyrobituminous shales, lignite, peat; pyrogeneous distillates, such as petroleum paraffin, peat paraffin, oil-gas tar, coal tar; pyrogeneous residues, such as blown petroleum asphalts, sludge asphalts, pressure tars, residual oils, oil-gas-tar pitch, wood pitch, etc. Of these materials, petroleum asphalt is most advantageously used, and it may be produced by steam-refining, by air-blowing, by solvent-extraction methods or by a combination of such methods.

Obviously many modifications and variations of the invention as hereinbefore set forth may be made without departing from the spirit and scope thereof, and therefore only such limitations should be imposed as are indicated in the appended claims.

I claim:

1. A bituminous-aqueous emulsion, wherein the bituminous substance normally possesses poor adhesiveness for hydrophilic aggregate, containing ammonium persulfate in a small amount sufficient substantially to improve the adhesiveness of said bituminous substance for hydrophilic aggregate in the presence of water.

2. Composition substantially as described in claim 1, wherein the bituminous substance is asphalt.

3. Composition substantially as described in claim 1, wherein the ammonium persulfate is present in an amount ranging from about 0.05 to about 2% by weight of the emulsion.

4. A bituminous coating composition for mineral aggregate of an oil-in-water type emulsion of a bituminous substance normally possessing inferior adhesiveness for hydrophilic aggregate, containing ammonium persulfate in a small amount sufficient substantially to improve the adhesiveness of said bituminous substance for hydrophilic aggregate in the presence of water.

5. Composition substantially as described in claim 4, wherein the bituminous substance is asphalt.

6. Composition substantially as described in claim 4, wherein the emulsion is a slow-setting oil-in-water type emulsion.

7. Composition substantially as described in claim 6, wherein the bituminous substance is asphalt.

PAUL E. McCOY.

REFERENCES CITED

The following references are of record in the file of this patent:

UNITED STATES PATENTS

| Number | Name | Date |
| --- | --- | --- |
| 998,691 | Kasson et al. | July 25, 1911 |
| 2,412,526 | McCoy | Dec. 10, 1946 |

FOREIGN PATENTS

| Number | Country | Date |
| --- | --- | --- |
| 417,776 | Canada | Jan. 18, 1944 |

OTHER REFERENCES

Gregory: "Uses and Applications of Chemicals and Related Materials," 1939, pp. 60 and 527.

"The Merck Index," 5th ed., 1940, pp. 39, 510 and 516.

Lange's Handbook of Chemistry, 4th ed., 1941, p. 122.